April 2, 1940.   F. W. EVERARD   2,196,065
CARRIER FOR OVERHEAD TRAM RAIL SYSTEMS
Filed Dec. 24, 1937

INVENTOR.
FREDERICK W. EVERARD
BY
ATTORNEYS

Patented Apr. 2, 1940

2,196,065

UNITED STATES PATENT OFFICE 2,196,065

CARRIER FOR OVERHEAD TRAM RAIL SYSTEMS

Frederick W. Everard, Willoughby, Ohio, assignor to The Cleveland Crane & Engineering Company, Wickliffe, Ohio, a corporation of Ohio Application December 24, 1937, Serial No. 181,548

3 Claims. (Cl. 105—148)

The present invention relates to overhead tram rail systems and more particularly to means for limiting the speed of carriers traveling down a grade, or to a carrier provided with means for limiting the speed thereof while traveling down a grade.

The rail or track of an overhead tram rail system for the most part usually lies in a horizontal plane and the carriers thereon are either manually or otherwise pushed thereabout. In the case of an electrified system the carriers are electrically propelled. Occasionally a portion of the rail or track may be placed on an incline, as in connecting portions of a system covering different floor levels. In the event that the system includes a portion of inclined rail or track, the carriers often attain excessively high speeds while traveling down such inclines with the result of damage sometimes to either the carrier or its load, or the rail, or articles placed along all aisles through which the carriers and their loads travel. Damage to a part of the system often results in failure of the entire system and interruption of the production or operation with which the system is used.

Devices heretofore employed for limiting the speed of carriers on a system such as that referred to have been both unsatisfactory and expensive, and the object of the present invention is the provision of a novel, inexpensive and reliable means for limiting the speed of carriers on an overhead monorail system.

Another object of the present invention is the provision of a novel truck adapted to be incorporated in a carrier for an overhead monorail system, which truck comprises simple, inexpensive, reliable, and efficient centrifugally actuated breaking means for limiting the speed thereof.

Another object of the present invention is the provision of a novel carrier for an overhead monorail system provided with simple, inexpensive, and reliable centrifugally actuated, automatic breaking means for limiting the speed thereof when traveling down a decline in said system.

The present invention resides in certain details of construction, and combinations and arrangements of parts, and further objects and advantages thereof will be apparent to those skilled in the art to which it relates, from the following description of the preferred embodiment thereof described with reference to the accompanying drawing forming a part of this specification, in which similar reference characters designate corresponding parts throughout the several views, and, in which.

Figure 1:
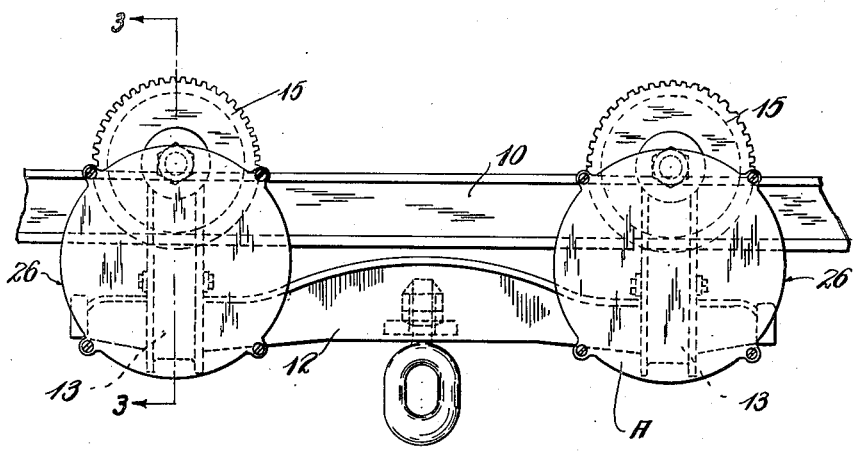
Fig. 1 is a side elevation of a portion of an overhead tram rail system of the monorail type showing a carrier embodying the present invention.

While the invention is susceptible of various modifications and alternative constructions as will be hereinafter apparent, it is herein illustrated and disclosed as embodied in a double truck carrier adapted to be manually pushed about the track or rail of an overhead monorail system.

Referring to the drawing, a carrier designated generally by the reference character A and embodying the present invention, is shown supported on a rail 10 forming a part of an overhead tram rail system. The rail or track 10 is suspended from the superstructure of the building in which the system is housed, or the like, in some convenient manner well known in the art, but not shown herein.

The carrier A comprises two trucks connected by a load bar 12 pivotally connected to yoke members 13 thereof by means of pins 14 fixed to the yoke members in some convenient manner. Both trucks shown are identical in construction and only one thereof will be described in detail.

Figures 2, 3:
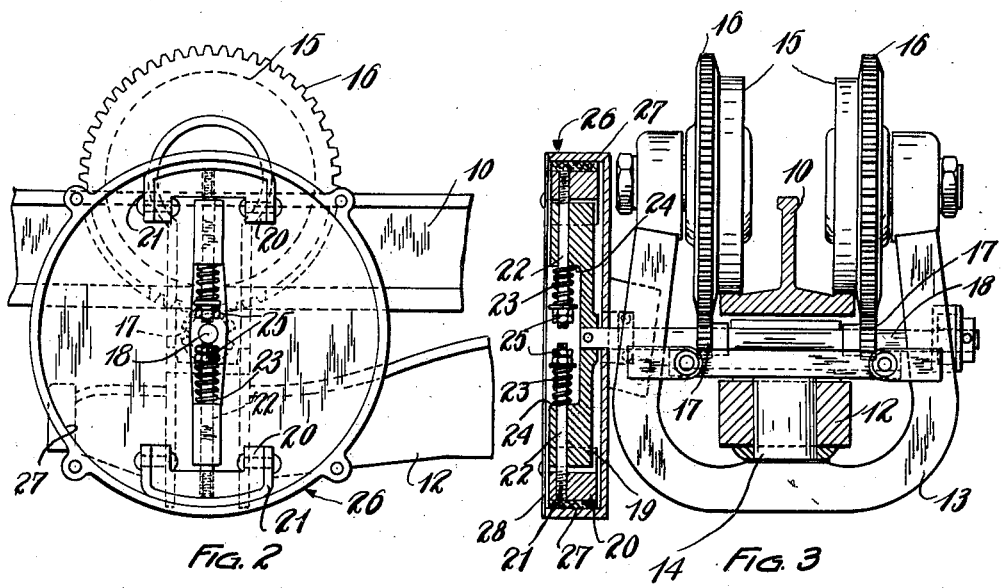
Fig. 2 is an enlarged view of a portion of Fig. 1 showing one of the trucks of the carrier with the cover plate removed, and, Fig. 3 is a section on line 3—3 of Fig. 1, with portions in elevation.

Referring to Figs. 2 and 3, the truck shown therein, in addition to the yoke member 13, which in effect is a part of the carrier frame, comprises a pair of flanged rail wheels 15 rotatably connected to the yoke member in a commercially known manner, adapted to support the carrier and travel along the tread flanges of the rail 10. According to the provisions of the present invention the speed of the carrier as it travels down an incline, etc. is limited by centrifugally actuated braking means the centrifugal member of which rotates at a considerably higher speed than the wheels of the carrier. As shown, each of the wheels 15 of the carrier comprises a gear wheel 16 integral therewith in the form of gear teeth cut about the periphery of the flange of the wheel. The gear wheels 16 are continuously in mesh with pinions 17 fixed to a shaft 18 rotatably supported in suitable bearings in the yoke member 13. The shaft 18 projects to the left of the yoke member 13 where it is provided with a member 19 keyed thereto, which member in turn carries a plurality of brake shoes 20, the exterior faces of which are provided with suitable brake lining 21.

The brake shoes 20 are fixed to the outer ends of radial pins 22 slidably supported in a suitable aperture in the member 19, and are continuously urged or withdrawn towards the axis of the shaft 18 by compression springs 23 surrounding the pins 22 and interposed between shoulders 24 formed on the member 19 and adjusting nuts 25 threaded onto the inner ends of the pins. The brake shoes 20 rotate within a drum-like member 26 fixed to the yoke 13 at a higher speed than the speed of the wheels 15, and when the carrier reaches a predetermined speed, depending upon the setting or adjustment of the springs 23, the brake shoes 20 engage the interior of the annular flange 27 of the member 26, producing a braking effect. The brake is very effective with the speeds encountered by carriers of the type referred to because of the fact that the speed of the shaft 18 and the centrifugally actuated brake shoe connected thereto is considerably higher than the speed of the wheels 15 due to the speed increasing gearing between the wheels 15 and the shaft 18. The assembly, including the member 19 and the brake shoes, etc., is adapted to be enclosed by a cover 28 detachably secured to the free edge of the flange 27.

It is thought that the operation of the device will be apparent from the foregoing description thereof. Suffice it to say, that while the carrier is traveling at a normal or safe rate of speed, the brake shoes are maintained clear of the flange 27 on the member 26, permitting the assembly, comprising the members 19, 20 and 21, etc., to rotate freely and without interfering with the free movement of the carrier along the system, but when the carrier exceeds a predetermined speed, the brake shoes 20 engage the flange 27 of the member 26 and act as a brake. In the preferred embodiment shown, both trucks of the carrier A are identical, but it will be apparent that the braking mechanism of the present invention may be incorporated in only one truck of the carrier if desired. It will also be apparent that the present invention is equally applicable to carriers of different design from that shown herein.

From the foregoing description of the preferred embodiment of the invention, it will be apparent that the objects heretofore enumerated and others have been accomplished and that a novel carrier for an overhead tramrail system has been provided. While the preferred embodiment of the invention has been illustrated and described with considerable detail, it is to be understood that the invention may be otherwise embodied and I do not wish to be limited to the particular construction referred to. It is the intention to hereby cover all modifications, adaptations and variations which come within the practice of those skilled in the art to which the present invention relates and within the spirit and scope of the invention as defined in the following claims.

I claim:

1. In an overhead carrier adapted to be supported from and travel along an overhead inverted T-shaped monorail track the combination of a load-supporting member or frame, a plurality of rail-engaging wheels operatively connected to said member, said wheels being adapted to engage opposite sides of said inverted T-shaped monorail, a shaft rotatably supported in said member, a centrifugally actuated brake operatively connected to said shaft for limiting the speed of the carrier, and speed increasing means for operatively connecting said shaft to one of said wheels whereby said shaft is rotated at a considerably higher speed than said wheel to which it is connected.

2. In an overhead carrier adapted to be supported from and travel along an overhead inverted T-shaped monorail track the combination of a load-supporting member or frame having an aperture therein provided with an internal annular surface, a plurality of rail-engaging wheels operatively connected to said member, said wheels being adapted to engage opposite sides of said inverted T-shaped monorail, a shaft rotatably supported by said load-supporting member or frame and projecting into said aperture, speed increasing drive means for operatively connecting one of said wheels and said shaft whereby said shaft is rotated at a considerably higher speed than said wheel upon movement of said carrier, a member connected to said shaft, a centrifugally actuated brake shoe carried by said member and adapted to engage said annular surface for limiting the speed of rotation of said shaft and in turn the speed of the carrier, and resilient means within said aperture and operatively connected to said brake shoe for normally maintaining said brake shoe out of contact with said annular surface.

3. In an overhead carrier adapted to be supported from and travel along an overhead inverted T-shaped monorail track the combination of a load-supporting member or frame having an aperture therein provided with an annular surface, a plurality of rail-engaging wheels operatively connected to said load-supporting member or frame, said wheels being adapted to engage opposite sides of said inverted T-shaped monorail, a shaft rotatably supported by said member or frame and projecting into said aperture, a gear wheel formed integral with one of said rail-engaging wheels, a pinion fixed to said shaft and in mesh with said gear wheel, the ratio of said gear wheel and said pinion being such that said shaft is rotated at a considerably higher speed than said wheel upon movement of said carrier, a bracket member carried by said shaft and rotatable within said aperture, a centrifugally actuated brake shoe movably carried by said bracket and adapted to engage said annular surface, and resilient means within said aperture and operatively connected to said brake shoe and to said bracket for continuously urging said brake shoe away from said annular surface.

FREDERICK W. EVERARD.